(12) United States Patent
Wang et al.

(10) Patent No.: US 9,881,228 B2
(45) Date of Patent: Jan. 30, 2018

(54) METHOD AND APPARATUS FOR REMOVING A MARK IN A DOCUMENT IMAGE

(71) Applicant: FUJITSU LIMITED, Kawasaki (JP)

(72) Inventors: Song Wang, Beijing (CN); Wei Fan, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 119 days.

(21) Appl. No.: 14/965,548

(22) Filed: Dec. 10, 2015

(65) Prior Publication Data

US 2016/0283817 A1    Sep. 29, 2016

(30) Foreign Application Priority Data

Mar. 26, 2015   (CN) .......................... 2015 1 0136941

(51) Int. Cl.
*G06K 9/46* (2006.01)
*G06T 5/00* (2006.01)

(52) U.S. Cl.
CPC ............ *G06K 9/4604* (2013.01); *G06T 5/002* (2013.01); *G06T 2207/30176* (2013.01)

(58) Field of Classification Search
CPC ......... H04N 21/8358; H04N 21/23892; H04N 2005/91335; G06T 1/005; G06T 1/0021; G06T 1/0028; G06T 5/002; G06T 2201/005; G06K 9/00798
See application file for complete search history.

(56) References Cited

U.S. PATENT DOCUMENTS 5,272,764 A *  12/1993  Bloomberg .............. G06K 9/20
                                                          358/453
6,542,629 B1 *  4/2003  Wu .................... H04N 1/00846
                                                          356/71
2003/0202696 A1 * 10/2003  Simard .............. G06K 9/00456
                                                          382/195

* cited by examiner

*Primary Examiner* — Eueng-Nan Yeh
(74) *Attorney, Agent, or Firm* — Staas & Halsey LLP

(57) ABSTRACT

A method for removing a mark in a document image includes: extracting connected components from a binary image corresponding to the document image; clustering the connected components based on grayscale features of the connected components to obtain one clustering center; searching, within numerical ranges of a clustering radius R and a grayscale threshold T, for a combination (R, T) which causes an evaluation value based on the grayscale features of the connected components to be higher than a first evaluation threshold; and removing the mark in the document image based on the grayscale threshold in the combination. The method and an apparatus according to the invention can remove a mark in a document image effectively and accurately.

16 Claims, 5 Drawing Sheets

METHOD AND APPARATUS FOR REMOVING A MARK IN A DOCUMENT IMAGE

CROSS-REFERENCE TO RELATED APPLICATIONS

This application relates to the subject matter of the Chinese patent application for invention, Application No. 201510136941.2, filed with Chinese State Intellectual Property Office on Mar. 26, 2015. The disclosure of this Chinese application is considered part of and is incorporated by reference in the disclosure of this application.

BACKGROUND

1. Field

The present invention generally relates to the field of image processing. Particularly, the invention relates to a method and apparatus for removing a mark in a document image effectively and accurately.

2. Description of the Related Art

In recent years, the technologies related to scanners have been developed rapidly. For example, those skilled in the art have made their great efforts to improve the processing effects of background perspective detection and removal, a document layout analysis, optical character recognition, and other technical aspects of a scanned document image. However, only the improvements in these aspects may not be sufficient, to achieve a better technical effect as a whole, all the aspects in the related art need to be improved.

For example, there are frequently a variety of marks in the scanned document image, e.g., a watermark to show the origin or ownership of the scanned document image, and a copymark to avoid a copy from being illegally used. These marks appearing as serious background noise may make it much more difficult to perform optical character recognition, and other processing. Moreover, these marks may seriously degrade the reading experience of a reader. FIG. 1 illustrates an example of the scanned document image with the watermark, and FIG. 2 illustrates an example of the scanned document image with the copymark.

Conventionally, a mark is removed typically through processing the document image on a pixel basis. Apparently, only the pixel level information is used in processing the document image on a pixel basis, so the limited information may make such processing relatively difficult and consequently a result of processing relatively inaccurate.

In view of this, there is a need of a method and apparatus capable of removing a mark in a document image effectively and accurately.

SUMMARY

Additional aspects and/or advantages will be set forth in part in the description which follows and, in part, will be apparent from the description, or may be learned by practice of the invention.

The following presents a simplified summary of the invention in order to provide basic understanding of some aspects of the invention. It shall be appreciated that this summary is not an exhaustive overview of the invention. It is not intended to identify key or critical elements of the invention or to delineate the scope of the invention. Its sole purpose is to present some concepts in a simplified form as a prelude to the more detailed description that is discussed later.

In view of the problem above in the prior art, an object of the invention is to provide a method and apparatus for removing a mark in a document image effectively and accurately.

In order to attain the object above, in an aspect of the invention, there is provided a method for removing a mark in a document image, the method including: extracting connected components from a binary image corresponding to the document image; clustering the connected components based on grayscale features of the connected components to obtain one clustering center; searching, within numerical ranges of a clustering radius R from the clustering center and a grayscale threshold T, for a combination (R, T) which causes an evaluation value based on the grayscale features of the connected components to be higher than a first evaluation threshold; and removing the mark in the document image based on the grayscale threshold in the combination.

In another aspect of the invention, there is provided an apparatus for removing a mark in a document image, the apparatus including: an extracting device configured to extract connected components from a binary image corresponding to the document image; a clustering device configured to cluster the connected components based on grayscale features of the connected components to obtain one clustering center; a searching device configured to search, within numerical ranges of a clustering radius R and a grayscale threshold T, for a combination (R, T) which causes an evaluation value based on the grayscale features of the connected components to be higher than a first evaluation threshold; and a fine removing device configured to remove the mark in the document image based on the grayscale threshold in the combination.

Furthermore, in a further aspect of the invention, there is further provided a storage medium including machine readable program codes which cause an information processing device to perform the method above according to the invention when the program codes are executed on the information processing device.

Moreover, in a still further aspect of the invention, there is further provided a program product including machine executable instructions which cause an information processing device to perform the method above according to the invention when the instructions are executed on the information processing device.

BRIEF DESCRIPTION OF THE DRAWINGS

The above and other objects, features and advantages of the invention will become more apparent from the following description of the embodiments of the invention with reference to the drawings throughout which components only aim to illustrate the principle of the invention and like or corresponding technical features or components will be denoted by like or corresponding reference numerals. In the drawings.

DETAILED DESCRIPTION

Figure 1:
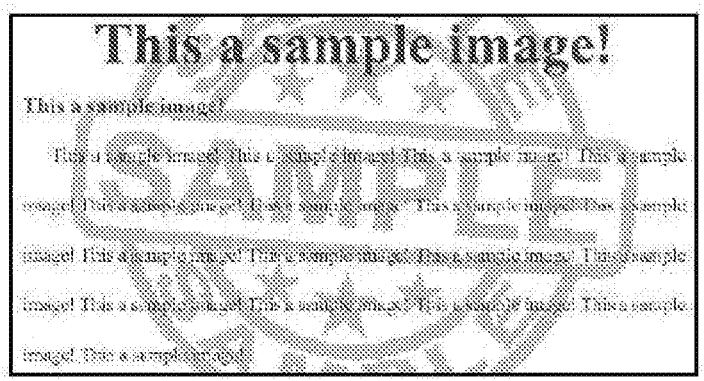
FIG. 1 illustrates an example of a scanned document image with a watermark.

Reference will now be made in detail to the embodiments, examples of which are illustrated in the accompanying drawings, wherein like reference numerals refer to the like elements throughout. The embodiments are described below to explain the present invention by referring to the figures.

Exemplary embodiments of the invention will be described below in details with reference to the drawings. For the sake of clarity and conciseness, not all the features of an actual implementation will be described in this specification. However, it shall be appreciated that in the development of any such actual implementation, numerous implementation-specific decisions shall be made to achieve the developers' specific goals, such as compliance with system-related and business-related constraints, which will vary from one implementation to another. Moreover, it shall be appreciated that such a development effort might be complex and time-consuming, but will nevertheless be a routine undertaking for those of ordinary skill in the art having the benefit of this disclosure.

It shall be further noted here that only the apparatus structures and/or process steps closely relevant to the solution according to the invention are illustrated in the drawings, but other details less relevant to the invention have been omitted, so as not to obscure the invention due to the unnecessary details. Moreover, it shall be further noted that an element and a feature described in one of the drawings or the embodiments of the invention can be combined with an element and a feature illustrated in one or more other drawings or embodiments.

A general idea of the invention lies in removing a mark in a document image by using connected component level information, and clustering the connected components, where it is of importance to obtain the best or second best clustering radius/grayscale threshold.

A flow of a method for removing a mark in a document image according to an embodiment of the invention will be described below with reference to FIG. 3.

Figure 3:
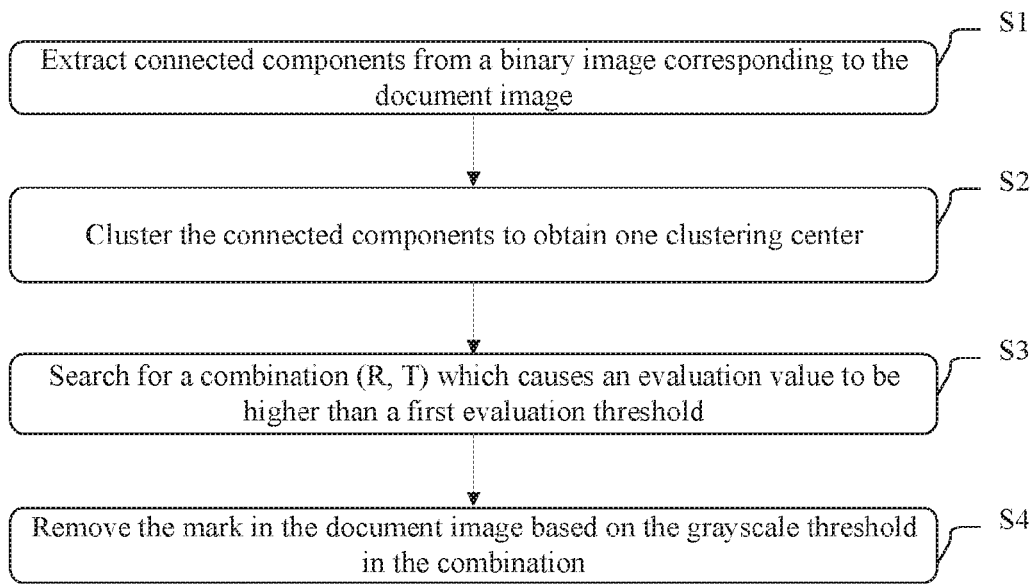
FIG. 3 illustrates a flow chart of a method for removing a mark in a document image according to an embodiment of the invention.

FIG. 3 illustrates a flow chart of a method for removing a mark in a document image according to an embodiment of the invention. As illustrated in FIG. 3, the method for removing a mark in a document image according to an embodiment of the invention includes the steps of: extracting connected components from a binary image corresponding to the document image (the step S1); clustering the connected components based on grayscale features of the connected components to obtain one clustering center (the step S2); searching, within numerical ranges of a clustering radius R and a grayscale threshold T, for a combination (R, T) which causes an evaluation value based on the grayscale features of the connected components to be higher than a first evaluation threshold (the step S3); and removing the mark in the document image based on the grayscale threshold in the combination (the step S4).

In the step S1, connected components are extracted from a binary image corresponding to the document image.

Figure 4:
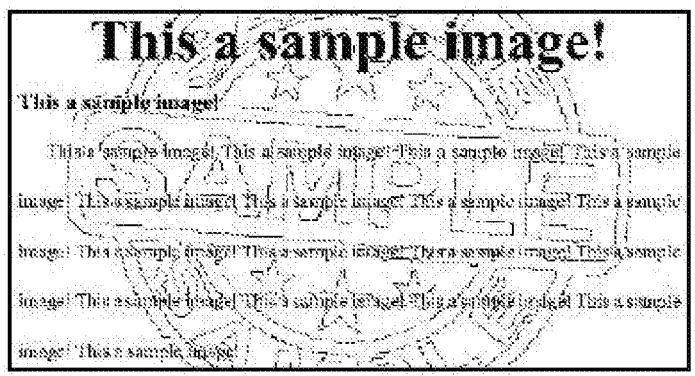
FIG. 4 illustrates a binary image corresponding to the example of the scanned document image with the watermark, illustrated in FIG. 1.
Figure 5:
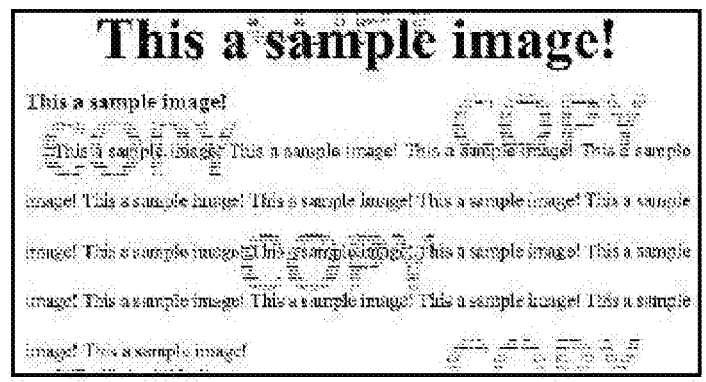
FIG. 5 illustrates a binary image corresponding to the example of the scanned document image with the copymark, illustrated in FIG. 2.

Firstly, a binarization process is performed on the document image to obtain the binary image corresponding to the document image. The binarization process is a common process in the field of image processing, so a detailed description thereof will be omitted here. A binarization threshold can be specified empirically by those skilled in the art. FIG. 4 illustrates a binary image corresponding to the example of the scanned document image with the watermark, illustrated in FIG. 1, and FIG. 5 illustrates a binary image corresponding to the example of the scanned document image with the copymark, illustrated in FIG. 2.

Figure 6:
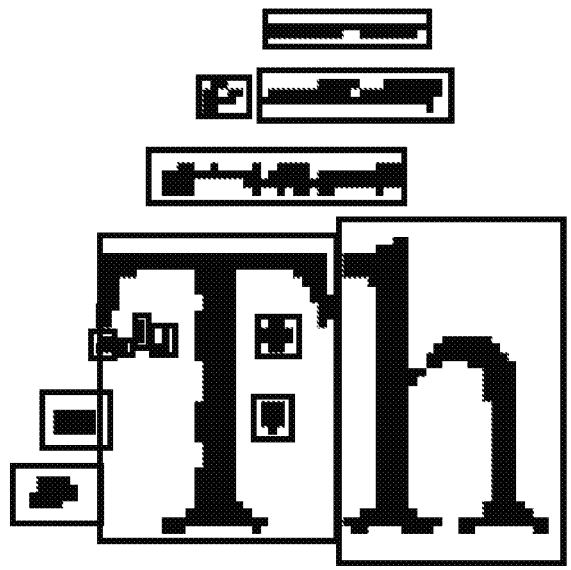
FIG. 6 illustrates an example of extracted connected components.

Then, the connected components are extracted from the binary image. The connected components refer to connected zones consisted of connected black pixels in the binary image. Extraction of the connected components will be well known to those skilled in the art of image processing, so a detailed description thereof will be omitted here. FIG. 6 illustrates an example of extracted connected components, where circum-rectangles of the connected components are further illustrated, which are also referred to bounding boxes.

In the step S2, the connected components are clustered based on grayscale features of the connected components to obtain one clustering center.

A general idea of the invention lies in that although the document image may vary in contents, the mark in the document image, e.g., the watermark or copymark, will substantially not vary but reoccur, so the connected components tending to be clustered together into the largest cluster shall correspond to the mark in the document image.

The connected components can be clustered based upon the grayscale features of the connected components. The grayscale feature of a connected component includes: minimum one of grayscale values of pixels in the document image, which correspond to all the black pixels in the connected component.

Preferably, the connected components can be clustered further based upon intrinsic features of the connected components. The intrinsic feature of a connected component includes at least one of: a number of black pixels in the connected component, a ratio of the number of the black pixels in the connected component to a number of pixels in a bounding box of the connected component, and an aspect ratio of the bounding box of the connected component, in the binary image.

In order to apply the inventive method to different document images, the grayscale features of the connected components, and the intrinsic features of the connected components need to be normalized. The grayscale features of the connected components are normalized throughout the document image and assigned predetermined weights; and the intrinsic features of the connected components are normalized throughout the binary image and assigned predetermined weights.

For example, if $x_i$ represents a feature of a connected component, $\bar{x}_i$ represents the average of the feature across all the connected components, and $w_i$ represents a predefined weight of the feature, the feature will be normalized into $$\frac{x_i w_i}{\overline{x_i}}.$$

If all the four features above are taken into account in clustering, each feature will be equivalent to a dimension, so the four features will constitute a four-dimension feature vector. Four weights corresponding to the four-dimension feature vector can be assigned empirically as $\vec{w}=(1,1,1,0.5)$, where 0.5 represents the weight of the grayscale feature of the connected component.

The connected components are clustered based upon the grayscale features of the connected components (and preferably further the intrinsic features of the connected components) to obtain one cluster center, particularly by counting the number of connected components within a range of a given clustering radius when each connected component serves as a clustering center, in a feature space; and determining the connected component corresponding to maximum one of the counted numbers as the clustering center.

Stated otherwise, given a clustering radius, such a connected component is determined with respect to this clustering radius that a cluster of the largest number of connected components can be obtained if the connected component is a clustering center. The connected component at the center of the largest cluster is determined as the clustering center.

Alternatively, the clustering center can be determined in another way than this.

Such a clustering center represents the center of background (mark) connected components because that the background connected components are typically similar in shape and grayscale, whereas foreground (text) connected components are typically dissimilar in shape, size, and grayscale.

In order to distinguish the foreground connected components from the background connected components, an appropriate clustering radius will be necessary in addition to the clustering center. Furthermore, the connected components are clustered from the perspective of the binary image, whereas an appropriate grayscale threshold can be set to distinguish the foreground from the background from the perspective of the document image. Stated otherwise, the connected components can be classified into the foreground and the background using the clustering center and the clustering radius, and then the background mark in the document image can be determined, according to the correspondence between the connected components in the binary image and the pixels in the document image. Alternatively, the background mark can be distinguished from the document image directly using the grayscale threshold.

In the step S3, a clustering radius R and a grayscale threshold T is searched for classifying the foreground and the background.

An appropriate evaluation value is designed so that the evaluation value will be the largest if the clustering radius R and the grayscale threshold T are the best. If or when the evaluation value is above the first evaluation threshold but not the largest, the clustering radius R and the grayscale threshold T will be the second best. Thus, the evaluation value can be used as a criterion to find the best or second best clustering radius R and grayscale threshold T.

The evaluation value can be based upon the grayscale features of the connected components. As described above, the grayscale feature of a connected component includes the minimum one of the grayscale values of pixels in the document image, which corresponds to all the black pixels in the connected component.

The evaluation value can be further based upon both the grayscale features of the connected components, and the number of black pixels in the connected components in the binary image.

The evaluation value reflects a degree of matching a result of classifying the connected components based on the clustering center and the clustering radius with a result of classifying the connected components based on the grayscale threshold because the two results of classification will be the most consistent if both the clustering radius and the grayscale threshold are both the most appropriate.

It shall be noted that both the clustering radius R and the clustering threshold T have certain ranges of values respectively. They can have limited numbers of values selected in their respective ranges of values at a certain step. A limited number of clustering radiuses R and a limited number of clustering thresholds T can constitute a limited number of combinations (R, T), for each of which a corresponding evaluation value f(R, T) can be calculated.

For example, the clustering radius R ranges from 0 to the maximum which is the distance between the clustering center, and the feature vector the furthest from the cluster center, in the feature space. An empirical range of (5, 8) for the clustering radius R can alternatively be assigned empirically. For example, the grayscale threshold T can range from 0 to 255.

The search for the combination (R, T) satisfying the evaluation value condition is equivalent to a two-dimension search, so both the clustering radius R and the grayscale threshold T can be varied, and such one of the limited number of combinations (R, T) can be found that the evaluation value is the largest or the evaluation value is above the first evaluation threshold. Alternatively, an iterative search can be made, that is, firstly one of the clustering radius R and the grayscale threshold T, e.g., the clustering radius R, is fixed, and then the other one, e.g., the grayscale threshold T, is varied until the best grayscale threshold T is found, and then the grayscale threshold T is fixed, and then the clustering radius R is varied until the best clustering radius R is found, resulting in the combination (R, T).

In the iterative search, for example, firstly a value of the clustering radius R is selected in the range of values of the clustering radius R, and then given this value, the connected components can be classified into foreground (text) connected components and background (mark) connected components according to the clustering center and the clustering radius R in the feature space, that is, the connected components corresponding to feature vectors inside a circle with the clustering center being an origin, and the clustering radius R being a radius are background (mark) connected components, and the connected components corresponding to the feature vectors outside the circle are foreground (text) connected components. Alternatively, the connected components can be classified into foreground connected components and background connected components according to the grayscale threshold T. At this time, the evaluation value f(R, T)=C(T) reflects the extent of matching of the result of classification according to the grayscale threshold T with the result of classification according to the clustering radius R if the clustering radius R is determined.

C(T) is calculated, for example, in Equation (1) of:

$$C(T) = \frac{\left(\dfrac{\sum_{i=1}^{n} B_i, G_i > T \text{ and } G_i < \overline{G}}{\sum_{i=1}^{n} B_i, G_i < \overline{G}} + \dfrac{\sum_{j=1}^{m} B'_j, G'_j < T \text{ and } G'_j > \overline{G}}{\sum_{j=1}^{m} B'_j, G'_j > \overline{G}}\right)}{2} \quad \text{(Equation 1)}$$

Where n represents the number of background connected components as a result of classification according to the clustering radius R, m represents the number of foreground connected components as a result of classification according to the clustering radius R, B represents the number of black pixels in the background connected components as a result of classification according to the clustering radius R, B' represents the number of black pixels in the foreground connected components as a result of classification according to the clustering radius R, G represents the minimum one of grayscale values of pixels in the document image, which correspond to all the black pixels in the background connected components as a result of classification according to the clustering radius R, G' represents the minimum one of grayscale values of pixels in the document image, which correspond to all the black pixels in the foreground connected components as a result of classification according to the clustering radius R, and $\overline{G}$ and $\overline{G'}$ represent the averages of G and G'.

$$\frac{\sum_{i=1}^{n} B_i, G_i > T \text{ and } G_i < \overline{G}}{\sum_{i=1}^{n} B_i, G_i < \overline{G}}$$

represents the ratio of the background connected components as a result of classification according to the grayscale threshold T to the background connected components as a result of classification according to the clustering radius R.

Where $G_i < \overline{G}$ precludes very black connected components which are sure to be foreground connected components, so a calculation effort can be alleviated due to this constraint condition. Of course, this constraint condition of $G_i < \overline{G}$ can be removed, so the ratio can be rewritten as $$\frac{\sum_{i=1}^{n} B_i, G_i > T}{\sum_{i=1}^{n} B_i}.$$

Furthermore, B here represents the number of black pixels in the background connected components as a result of classification according to the clustering radius R, where the number of black pixels is counted. Alternatively, all the B can be set to 1 so that the number of connected components is counted.

$$\frac{\sum_{j=1}^{m} B'_j, G'_j < T \text{ and } G'_j > \overline{G}}{\sum_{j=1}^{m} B'_j, G'_j > \overline{G}}$$

represents the ratio of the foreground connected components as a result of classification according to the grayscale threshold T to the foreground connected components as a result of classification according to the clustering radius R.

Where $G'_j > \overline{G'}$ precludes very white connected components which are sure to be background connected components, so a calculation effort can be alleviated due to this constraint condition. Of course, this constraint condition of $G'_j > \overline{G'}$ can be removed, so the ratio can be rewritten as $$\frac{\sum_{j=1}^{m} B'_j, G'_j < T}{\sum_{j=1}^{m} B'_j}.$$

Furthermore, B' here represents the number of black pixels in the foreground connected components as a result of classification according to the clustering radius R, where the number of black pixels is counted. Alternatively, all the B' can be set to 1 so that the number of connected components is counted.

In summary, Equation (1) can also be written into Equation (2) of:

$$C(T) = \frac{\left(\dfrac{\sum_{i=1}^{n} B_i, G_i > T}{\sum_{i=1}^{n} B_i} + \dfrac{\sum_{j=1}^{m} B'_j, G'_j < T}{\sum_{j=1}^{m} B'_j}\right)}{2} \quad \text{(Equation 2)}$$

Moreover, both B and B' in Equation (1) and Equation (2) above can be set to 1.

If the clustering radius R is fixed and the grayscale threshold T is varied, resulting in a number of C(T), then the grayscale threshold T corresponding to the largest C(T) will be selected and then fixed, and alike the clustering radius R will be selected, resulting in the combination (R, T).

Of course, alternatively firstly the grayscale threshold T can be fixed, and the clustering radius R can be found, and then the clustering radius R can be fixed, and the grayscale threshold T can be found, resulting in the combination (R, T).

By the way, the evaluation value can be used as a criterion to determine whether there is a mark in the document image in addition to the criterion to find the best or second best clustering radius R and grayscale threshold T. If the evaluation value is below the empirically set second evaluation threshold, it can be determined that there is no mark in the document image.

In the step S4, the mark in the document image is removed based on the grayscale threshold in the combination.

As described above, the connected components can be classified into foreground (text) connected components and background (mark) connected components according to the grayscale threshold in the combination. The pixels corresponding to the background (mark) connected components can be removed from the document image to thereby remove the mark in the document image effectively and accurately.

Of course, it can be appreciated that the mark in the document image can also be removed based upon the clustering center, and the clustering radius in the combination.

By comparison, preferably the mark in the document image is removed based upon the grayscale threshold because the grayscale is the most significant criterion to distinguish a foreground text from background noise. The result of separation based upon the clustering radius R can only be regarded as a rough result of separation, whereas the result of separation based upon the grayscale threshold T in the grayscale space is a more precise result.

Figure 2:
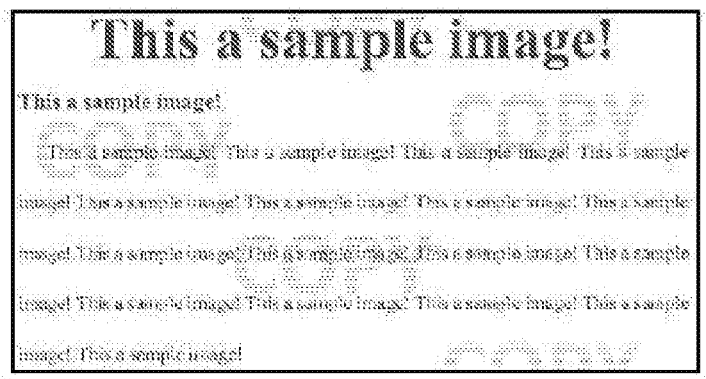
FIG. 2 illustrates an example of a scanned document image with a copymark.
Figure 7:
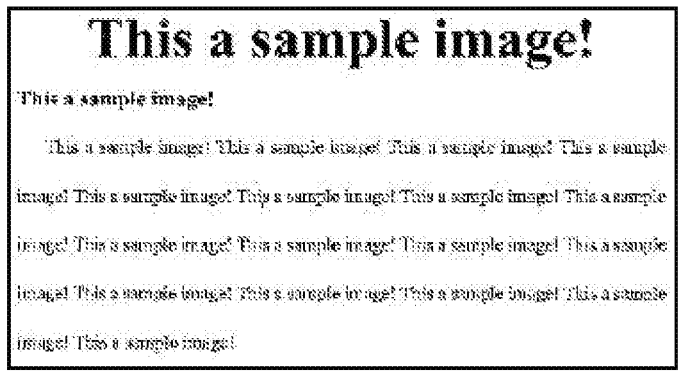
FIG. 7 illustrates a result of removing the mark in the example of the scanned document image with the watermark, illustrated in FIG. 1.
Figure 8:
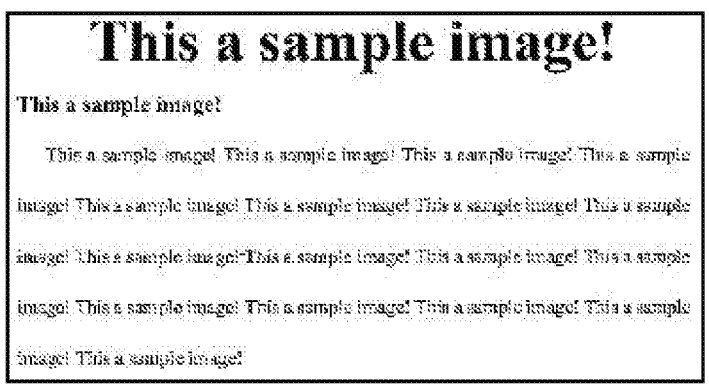
FIG. 8 illustrates a result of removing the mark in the example of the scanned document image with the copymark, illustrated in FIG. 2.

FIG. 7 illustrates a result of removing the mark in the example of the scanned document image with the watermark, illustrated in FIG. 1, and FIG. 8 illustrates a result of removing the mark in the example of the scanned document image with the copymark, illustrated in FIG. 2.

An apparatus for removing a mark in a document image according to an embodiment of the invention will be described below with reference to FIG. 9.

Figure 9:
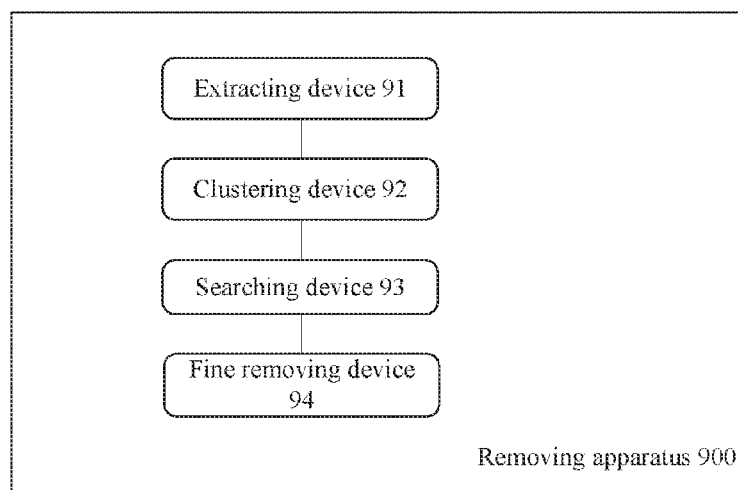
FIG. 9 illustrates a structural block diagram of an apparatus for removing a mark in a document image according to an embodiment of the invention.

FIG. 9 illustrates a structural block diagram of an apparatus for removing a mark in a document image according to an embodiment of the invention. As illustrated in FIG. 9, the removing apparatus 900 according to the invention includes: an extracting device 91 configured to extract connected components from a binary image corresponding to the document image; a clustering device 92 configured to cluster the connected components based on grayscale features of the connected components to obtain one clustering center; a searching device 93 configured to search, within numerical ranges of a clustering radius R and a grayscale threshold T, for a combination (R, T) which causes an evaluation value based on the grayscale features of the connected components to be higher than a first evaluation threshold; and a fine removing device 94 configured to remove the mark in the document image based on the grayscale threshold in the combination.

In an embodiment, the grayscale feature of a connected component includes: a minimum value of grayscale values of pixels in the document image, which correspond to all black pixels in the connected component.

In an embodiment, the clustering device 92 is further configured to cluster the connected components based on grayscale features and intrinsic features of the connected components to obtain one clustering center; wherein the intrinsic feature of a connected component includes at least one of: a number of black pixels included in the connected component, a ratio of the number of the black pixels included in the connected component to a number of pixels in a bounding box of the connected component, and an aspect ratio of the bounding box of the connected component, in the binary image.

In an embodiment, the grayscale features of the connected components are normalized throughout the document image and assigned predetermined weights; and the intrinsic features of the connected components re normalized throughout the binary image and assigned predetermined weights.

In an embodiment, the clustering device 92 is further configured to count the number of connected components within a range of a given clustering radius when each connected component serves as a clustering center, in a feature space of the grayscale features; and to determine the connected component corresponding to a maximum one of the counted numbers as the clustering center.

In an embodiment, the evaluation value is further based on the numbers of black pixels included in the connected components in the binary image.

In an embodiment, the evaluation value reflects a degree of matching a result of classifying the connected components based on the clustering center and the clustering radius with a result of classifying the connected components based on the grayscale threshold.

In an embodiment, the removing apparatus 900 further includes a determining device configured to determine that there is no mark in the document image if the evaluation value is below a second evaluation threshold.

In an embodiment, the removing apparatus 900 further includes a rough removing device configured to remove the mark in the document image based on the clustering center, and the clustering radius in the combination.

In an embodiment, the fine removing device 94 is further configured to remove the connected components, the grayscale features of which are higher than the grayscale threshold.

In an embodiment, the mark includes a watermark and/or a copymark.

The processes in the respective devices and units in the removing apparatus 900 according to the invention are similar respectively to those in the respective steps in the removing method described above, so a detailed description of these devices and units will be omitted here for the sake of conciseness.

Moreover, it shall be noted that the respective devices and units in the above apparatus can be configured in software, firmware, hardware or any combination thereof. How to particularly configure them will be well known to those skilled in the art, so a detailed description thereof will be omitted here. In the case of being embodied in software or firmware, program constituting the software or firmware can be installed from a storage medium or a network to a computer with a dedicated hardware structure (e.g., a general-purpose computer 1000 illustrated in FIG. 10) which can perform various functions when various pieces of programs are installed thereon.

Figure 10:
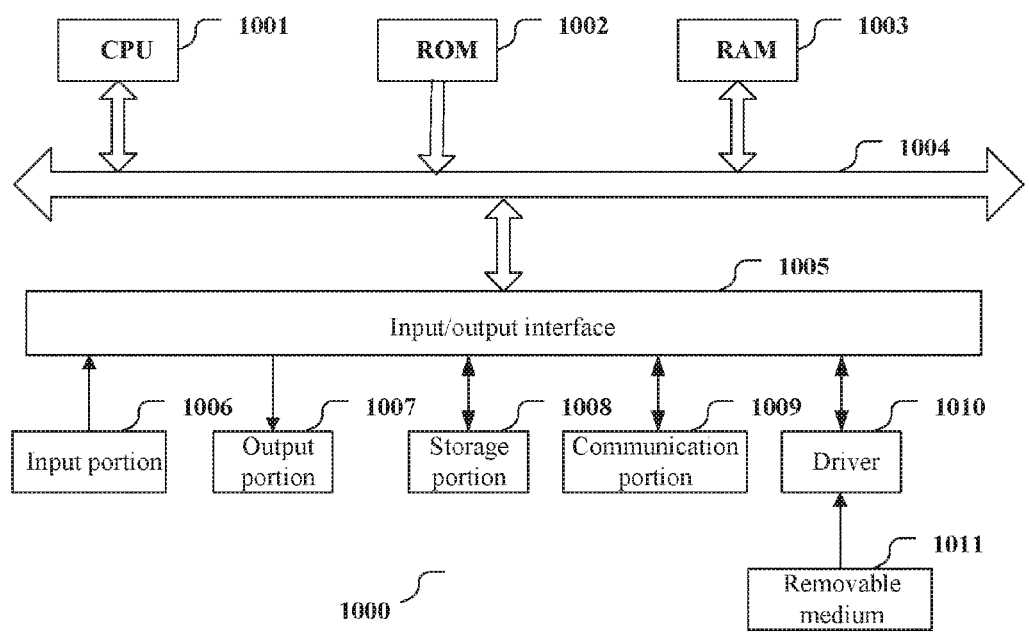
FIG. 10 illustrates a schematic block diagram of a computer in which the method and the apparatus according to the embodiments of the invention can be embodied.

FIG. 10 illustrates a schematic block diagram of a computer in which the method and the apparatus according to the embodiments of the invention can be embodied.

In FIG. 10, a Central Processing Unit (CPU) 1001 performs various processes according to program stored in a Read Only Memory (ROM) 1002 or loaded from a storage portion 1008 into a Random Access Memory (RAM) 1003 in which data required when the CPU 1001 performs the various processes, etc., is also stored as needed. The CPU 1001, the ROM 1002, and the RAM 1003 are connected to each other via a bus 1004 to which an input/output interface 1005 is also connected.

The following components are connected to the input/output interface 1005: an input portion 1006 (including a keyboard, a mouse, etc.), an output portion 1007 (including a display, e.g., a Cathode Ray Tube (CRT), a Liquid Crystal Display (LCD), etc., a speaker, etc.), a storage portion 1008 (including a hard disk, etc.), and a communication portion 1009 (including a network interface card, e.g., an LAN card, an MODEM, etc). The communication portion 1009 performs a communication process over a network, e.g., the Internet. A driver 1010 is also connected to the input/output interface 1005 as needed. A removable medium 1011, e.g., a magnetic disk, an optical disk, an optic-magnetic disk, a semiconductor memory, etc., can be installed on the driver 1010 as needed so that computer program fetched therefrom can be installed into the storage portion 1008 as needed.

In the case that the foregoing series of processes are performed in software, program constituting the software can be installed from a network, e.g., the Internet, etc., or a storage medium, e.g., the removable medium 1011, etc.

Those skilled in the art shall appreciate that such a storage medium will not be limited to the removable medium 1011 illustrated in FIG. 10 in which the program is stored and which is distributed separately from the apparatus to provide a user with the program. Examples of the removable medium 1011 include a magnetic disk (including a Floppy Disk), an optical disk (including Compact Disk-Read Only memory (CD-ROM) and a Digital Versatile Disk (DVD)), an optic-magnetic disk (including a Mini Disk (MD) (a registered trademark)) and a semiconductor memory. Alternatively, the storage medium can be the ROM 1002, a hard disk included in the storage portion 1008, etc., in which the program is stored and which is distributed together with the apparatus including the same to the user.

The invention further proposes a product program on which machine readable instruction codes are stored. The instruction codes can perform the above method according to the embodiment of the invention upon being read and executed by a machine.

Correspondingly, a storage medium carrying the above program product on which the machine readable instruction codes are stored will also be encompassed in the disclosure of the invention. The storage medium can include but will not be limited to a floppy disk, an optical disk, an optic-magnetic disk, a memory card, a memory stick, etc.

In the foregoing description of the particular embodiments of the invention, a feature described and/or illustrated with respect to an implementation can be used identically or similarly in one or more other implementations in combination with or in place of a feature in the other implementation(s).

It shall be noted that the term "include/comprise" as used in this context refers to the presence of a feature, an element, a step or a component but will not preclude the presence or addition of one or more other features, elements, steps or components.

Furthermore, the method according to the invention will not necessarily be performed in a sequential order described in the specification, but can alternatively be performed sequentially in another sequential order, concurrently or separately. Therefore, the technical scope of the invention will not be limited by the order in which the methods are performed as described in the specification.

Although the invention has been disclosed above in the description of the particular embodiments of the invention, it shall be appreciated that all the embodiments and examples above are illustrative but not limiting. Those skilled in the art can make various modifications, adaptations or equivalents to the invention without departing from the spirit and scope of the appended claims. These modifications, adaptations or equivalents shall also be regarded as falling into the scope of the invention.

Annexes

1. A method for removing a mark in a document image, the method comprising:

extracting connected components from a binary image corresponding to the document image;

clustering the connected components based on grayscale features of the connected components to obtain one clustering center;

searching, within numerical ranges of a clustering radius R and a grayscale threshold T, for a combination (R, T) which causes an evaluation value based on the grayscale features of the connected components to be higher than a first evaluation threshold; and removing the mark in the document image based on the grayscale threshold in the combination.

2. The method according to annex 1, wherein the grayscale features of the connected components comprise: minimum one of grayscale values of pixels in the document image, which correspond to all black pixels in one connected component.

3. The method according to annex 1, wherein the connected components are clustered further based on intrinsic features of the connected components to obtain one clustering center; wherein the intrinsic features of the connected components comprise at least one of: a number of black pixels in one connected component, a ratio of the number of the black pixels in the connected component to a number of pixels in a bounding box of the connected component, and an aspect ratio of the bounding box of the connected component, in the binary image.

4. The method according to annex 1, wherein the clustering the connected components based on grayscale features of the connected components to obtain one clustering center comprises:

counting a number of connected components within a range of a given clustering radius when each connected component serves as a clustering center, in a feature space of the grayscale features; and determining a connected component corresponding to maximum one of the counted numbers as the clustering center.

5. The method according to annex 1, wherein the evaluation value is further based on a number of black pixels in one connected component in the binary image.

6. The method according to annex 1, wherein the evaluation value reflects a degree of matching a result of classifying the connected components based on the clustering center and the clustering radius with a result of classifying the connected components based on the grayscale threshold.

7. The method according to annex 1, wherein if the evaluation value is lower than a second evaluation threshold, it is judged that there is no mark in the document image.

8. The method according to annex 1, further including: removing the mark in the document image based on the clustering center and the clustering radius in the combination.

9. The method according to annex 1, wherein the removing the mark in the document image based on the grayscale threshold in the combination comprises:

removing the connected components, the grayscale features of which are greater than the grayscale threshold.

10. The method according to annex 1, wherein the mark includes a watermark and/or a copymark.

11. An apparatus for removing a mark in a document image, the apparatus including:

an extracting device configured to extract connected components from a binary image corresponding to the document image;

a clustering device configured to cluster the connected components based on grayscale features of the connected components to obtain one clustering center;

a searching device configured to search, within numerical ranges of a clustering radius R and a grayscale threshold T, for a combination (R, T) which causes an evaluation value based on the grayscale features of the connected components to be higher than a first evaluation threshold; and a fine removing device configured to remove the mark in the document image based on the grayscale threshold in the combination.

12. The apparatus according to annex 11, wherein the grayscale features of the connected components comprise: minimum one of grayscale values of pixels in the document image, which correspond to all black pixels in one connected component.

13. The apparatus according to annex 11, wherein the clustering device is further configured to cluster the connected components based on the grayscale features and intrinsic features of the connected components to obtain one clustering center; wherein the intrinsic features of the connected components comprise at least one of: a number of black pixels in one connected component, a ratio of the number of the black pixels in the connected component to a number of pixels in a bounding box of the connected component, and an aspect ratio of the bounding box of the connected component, in the binary image.

14. The apparatus according to annex 11, wherein the clustering device is further configured:

to count a number of connected components within a range of a given clustering radius when each connected component serves as a clustering center, in a feature space of the grayscale features; and to determine a connected component corresponding to maximum one of the counted numbers as the clustering center.

15. The apparatus according to annex 11, wherein the evaluation value is further based on a number of black pixels in one connected component in the binary image.

16. The apparatus according to annex 11, wherein the evaluation value reflects a degree of matching a result of classifying the connected components based on the clustering center and the clustering radius with a result of classifying the connected components based on the grayscale threshold.

17. The apparatus according to annex 11, further including a judging device configured to judge that there is no mark in the document image if the evaluation value is lower than a second evaluation threshold.

18. The apparatus according to annex 11, further including a rough removing device configured to remove the mark in the document image based on the clustering center and the clustering radius in the combination.

19. The apparatus according to annex 11, wherein the fine removing device is further configured to remove the connected components, the grayscale features of which are greater than the grayscale threshold.

20. The apparatus according to annex 11, wherein the mark includes a watermark and/or a copymark.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method for removing a mark in a document image, the method comprising:

extracting connected components from a binary image corresponding to the document image;

clustering the connected components based on grayscale features of the connected components to obtain one clustering center;

searching, within numerical ranges of a clustering radius R from the clustering center and a grayscale threshold T, for a combination (R, T) which causes an evaluation value based on the grayscale features of the connected components to be higher than a first evaluation threshold; and removing the mark in the document image based on the grayscale threshold in the combination;

wherein the grayscale features of the connected components comprise: a minimum one of grayscale values of pixels in the document image, which correspond to all black pixels in each of connected components;

wherein the removing the mark in the document image based on the grayscale threshold in the combination comprises:

removing the connected components, the grayscale features of which are greater than the grayscale threshold, as the mark in the document image.

2. The method according to claim 1, wherein the connected components are clustered further based on intrinsic features of the connected components to obtain the one clustering center; wherein the intrinsic features of the connected components comprise at least one of: a number of black pixels in each of the connected components, a ratio of the number of the black pixels in the connected component to a number of pixels in a bounding box of the connected component, and an aspect ratio of the bounding box of the connected component, in the binary image.

3. The method according to claim 1, wherein the clustering the connected components based on grayscale features of the connected components to obtain the one clustering center comprises:

counting a number of connected components within a range of a given clustering radius when each connected component serves as a clustering center, in a feature space of the grayscale features; and determining a connected component corresponding to a maximum one of counted numbers as the clustering center.

4. The method according to claim 1, wherein the evaluation value is further based on a number of black pixels in one connected component in the binary image.

5. The method according to claim 1, wherein the evaluation value reflects a degree of matching of a result of classifying the connected components based on the clustering center and the clustering radius with a result of classifying the connected components based on the grayscale threshold.

6. The method according to claim 1, wherein, when the evaluation value is lower than a second evaluation threshold, it is judged that there is no mark in the document image.

7. The method according to claim 1, further comprising: removing the mark in the document image based on the clustering center and the clustering radius in the combination.

8. The method according to claim 1, wherein the mark comprises one of a watermark and a copymark.

9. An apparatus for removing a mark in a document image, the apparatus comprising:

an extracting device configured to extract connected components from a binary image corresponding to the document image;

a clustering device configured to cluster the connected components based on grayscale features of the connected components to obtain one clustering center;

a searching device configured to search, within numerical ranges of a clustering radius R from the clustering center and a grayscale threshold T, for a combination (R, T) which causes an evaluation value based on the grayscale features of the connected components to be higher than a first evaluation threshold; and a fine removing device configured to remove the mark in the document image based on the grayscale threshold in the combination;

wherein the grayscale features of the connected components comprise: a minimum one of grayscale values of pixels in the document image, which correspond to all black pixels in each of connected components;

wherein the fine removing device is further configured to remove the connected components, the grayscale features of which are greater than the grayscale threshold, as the mark in the document image.

10. The apparatus according to claim 9, wherein the clustering device is further configured to cluster the connected components based on the grayscale features and intrinsic features of the connected components to obtain the one clustering center; wherein the intrinsic features of the connected components comprise at least one of: a number of black pixels in each of the connected components, a ratio of the number of the black pixels in the connected component to a number of pixels in a bounding box of the connected component, and an aspect ratio of the bounding box of the connected component, in the binary image.

11. The apparatus according to claim 9, wherein the clustering device is further configured:

to count a number of connected components within a range of a given clustering radius when each connected component serves as a clustering center, in a feature space of the grayscale features; and to determine a connected component corresponding to a maximum one of counted numbers as the clustering center.

12. The apparatus according to claim 9, wherein the evaluation value is further based on a number of black pixels in one connected component in the binary image.

13. The apparatus according to claim 9, wherein the evaluation value reflects a degree of matching of a result of classifying the connected components based on the clustering center and the clustering radius with a result of classifying the connected components based on the grayscale threshold.

14. The apparatus according to claim 9, further comprising a judging device configured to judge that there is no mark in the document image when the evaluation value is lower than a second evaluation threshold.

15. The apparatus according to claim 9, further comprising a rough removing device configured to remove the mark in the document image based on the clustering center and the clustering radius in the combination.

16. The apparatus according to claim 9, wherein the mark comprises one of a watermark and a copymark.

* * * * *